Feb. 15, 1944.     R. H. PHELPS     2,341,811
STEERING KNUCKLE
Filed Jan. 8, 1941
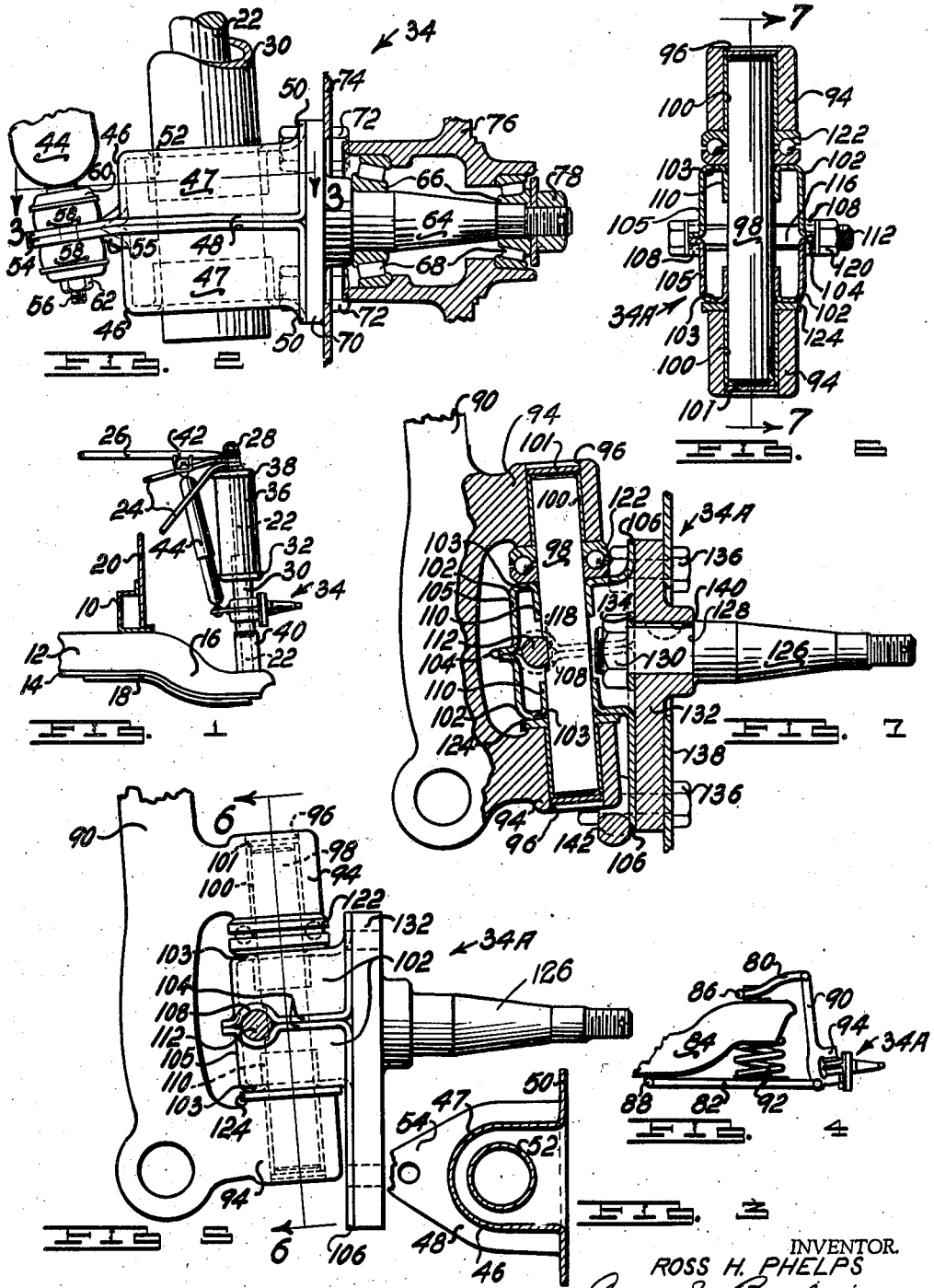
INVENTOR.
ROSS H. PHELPS
BY
ATTORNEY.

Patented Feb. 15, 1944

2,341,811

UNITED STATES PATENT OFFICE 2,341,811

STEERING KNUCKLE

Ross H. Phelps, Kenosha, Wis., assignor to Nash-Kelvinator Corporation, Kenosha, Wis., a corporation of Maryland Application January 8, 1941, Serial No. 373,544

18 Claims. (Cl. 280—96.1)

This invention relates to steering knuckles and has particular reference to a steering knuckle made up of stamped metal parts for use on an automotive vehicle.

It is an object of this invention to provide a steering knuckle which will be of lighter weight than steering knuckles known heretofore.

It is another object of this invention to provide a steering knckle which will be cheaper to construct than steering knckles known heretofore.

It is another object of this invention to provide a stamped steering knuckle with means for attaching a shock absorber thereto.

It is another object of this invention to provide a steering knuckle which will support a wheel spindle which can be easily and separately machined.

Other objects and advantages of this invention will be apparent from a consideration of the following description and claims and the attached drawing, of which there is one sheet, and in which—

Figure 1 represents a front elevation partially broken away of an automotive suspension system;

Figure 2 represents an enlarged detailed view of the steering knuckle illustrated in Figure 1;

Figure 3 represents a sectional view taken along a plane indicated by the line 3—3 in Figure 2;

Figure 4 represents a front elevation of a parallel arm type of automotive wheel suspension;

Figure 5 represents an enlarged detailed view of the lower portion of the support arm shown in Figure 4;

Figure 6 represents a section taken along a plane indicated by the line 6—6 in Figure 5 and looking in the direction of the arrows; and Figure 7 represents a sectional view taken along a plane indicated by the line 7—7 in Figure 6 and looking in the direction of the arrows.

In the past it has been the practice to form steering knuckles on automobiles as forgings and to machine the wheel spindle and backing plate flange directly on the steering knuckle forging. The steering knuckle was then attached to rotate with or about a king pin which was journalled on part of the spring mounted suspension system.

The present invention provides a steering knuckle made up of two generally cup shaped stampings having flanges turned outwardly along the rims of the stampings. Each of the stampings is provided with an open side from the edges of which flanges are bent outwardly in a single plane. The two stampings are joined together in opposed relationship to form a generally cylindrical hollow body with an open side. The flanges along the rims of the cup shaped stampings are secured together as by welding and the bases of the stampings are pierced and extruded inwardly in axial alignment. The extruded portions are clamped to a rotatable shaft which is spring mounted upon the automobile and a wheel spindle and backing plate are bolted to the plane flanges along the open side of the stampings to support the wheel. The steering knuckle thus formed consists of a hollow generally cylindrical member to the side of which is bolted the spindle and backing plate. The steering knuckle may be applied to various types of wheel suspension systems, two of which are shown in the drawing.

In Figures 1 and 2 the invention is shown to be applied to an automobile having a side rail member 10 to the bottom of which is attached a cross member 12 having a generally channel shaped cross section which opens downwardly and is flanged outwardly at the bottom as at 14. The outer end of the cross member 12 is bent downwardly as at 16 and the curved portion of the cross member is reinforced by a closing plate 18 which is welded across the flanges 14 to form the cross member into a box section. A wheel house panel 20 is welded along the outside of the side rail 10 to form a hollow box section.

Supported upon the end of the cross member 12 is a generally vertical king pin 22, the upper end of which is braced to the body of the automobile by a pair of brace rods 24. The top of the king pin is also connected to a tie rod 26 which extends transversely across the automobile to a similar king pin on the opposite side of the automobile. The brace rods 24 and tie rod 26 are secured on the king pin by a nut 28.

Slideably and rotatably mounted around the outside of the king pin 22 is a sleeve or hollow shaft 30 which carries a lower spring seat 32 and a steering knuckle generally indicated at 34. A coil spring assembly 36 (enclosed in a rubber boot) is mounted between the spring seat 32 and an upper spring seat 38 carried at the top of the king pin. A flexible bellows 40 is provided between the lower end of the sleeve 30 and the top of the cross member 12 to keep dust from entering between the king pin and sleeve. The construction of the king pin 22, sleeve 30, spring support 36, 38 and the brace rods 24 and 26 is more particularly described in the co-pending application of Nils Erik Wahlberg, Ross H. Phelps and Wallace S. Berry for Automotive suspension, Serial No. 370,286, filed December 16, 1940, now Patent No. 2,325,894, dated August 3, 1943.

The tie rod 26 is provided near its end with a U-shaped clip 42 to which is attached the upper end of a strut type shock absorber 44. The lower end of the shock absorber is attached to the steering knuckle 34 in a manner which will be more particularly described later.

Considering the steering knuckle 34 in detail, attention is called to Figure 2 in which the steering knuckle is shown to be made up of a pair of generally cup shaped stampings 46, each having semi-cylindrical side walls 47 and flanges 48 turned outwardly from their rim portions. One side of the stampings 46 is open and flanges 50 are turned outwardly of the stampings into a generally vertical plane. The bases of the cup shaped stampings 46 are pierced and extruded as at 52 and the stampings are joined together in opposed relationship by welding the flanges 48 to each other. The extruded portions 52 of the stampings are in axial alignment so that the sleeve 30 may be secured inside of the stampings as by press fitting or welding. The flanges 48 are extended on the opposite side of the stampings from the flanges 50 to form ears 54 which are apertured to receive the lower bayonet end 56 of the shock absorber 44. It will be noted that the side walls 47 of the stampings are bent outwardly at an angle as at 55 at the base of the ears 54 to reinforce them and prevent them from bending. Rubber grommets 58 are retained by the cup shaped metal washers 60 and the nut 62 on the lower side of the ears 54 to yieldably connect the shock absorber to the ears 54.

The wheel spindle 64 on which the races 66 and ball bearings 68 are supported is provided with a flat flange 70 which is secured to the flanges 50 of the stampings 46 by means of bolts 72. The bolts 72 also function to hold the backing plate 74 of the brake assembly to the flange 70. A hub portion 76 of the wheel is shown supported upon the bearings 68 and retained in place by the nut 78 threaded on the end of the spindle 64.

In Figures 4 to 7 the invention is shown as applied to the well known parallel arm type of suspension in which an upper control arm 80 and a lower control arm 82 are pivotally supported to a cross member 84 as at 86 and 88 respectively. The outer ends of the control arms are pivotally connected to a steering knuckle support arm 90 and a coil spring 92 is positioned between the cross member 84 and the lower control arm.

The steering knuckle support arm 90 is provided near its lower end with a pair of bosses 94 which extend outwardly from the support arm and which are apertured along a line generally parallel to the axis of the support arm as at 96. A king pin 98 is journaled in bearings 100 carried in the bosses 94 and the ends of the apertures are closed by plugs 101.

Positioned between the bosses 94 is a steering knuckle 34A which is similar to the steering knuckle 34 shown in Figures 1, 2 and 3. The steering knuckle 34A is formed of a pair of generally cup shaped stampings 102 having semi-cylindrical side walls 105 and flanges 104 turned outwardly from their rims and provided with an open side, the edges of which are flanged outwardly as at 106. It will be noted that the flange 106 on the lower stamping 102 extends downwardly for a considerable distance below the body of the stamping. Each of the flanges 104 are provided with semicircular depressed portions 108 upon opposite sides of the stampings and adapted to mate when the two stampings are assembled to provide axially aligned holes. The bases 103 of the stampings 102 are pierced and extruded inwardly as at 110 and the flanges 104 are secured together as by welding to form a hollow generally cylindrical steering knuckle having an open side along which the flange 106 extends in a single plane.

The king pin 98 is passed through the extruded portions 110 of the steering knuckle and is secured to the steering knuckle by a locking pin 112 which is passed through the holes formed by the semicircular depressed portions 108 of the flanges 104. The pin 112 is provided with a flat tapered side 116 (see Figure 6) which mates with a flat surface 118 formed on the king pin 98. The pin 112 is drawn tight against the king pin by means of the nut 120 (see Figure 6).

A ball bearing assembly 122 is positioned between the upper surface of the steering knuckle 34A and the bottom of the upper boss 94 to facilitate rotation of the king pin and steering knuckle with respect to the control arm 90. A simple thrust washer 124 is provided between the lower surface of the steering knuckle and the lower boss 94.

The wheel spindle 126 is shown to be provided with a shoulder 128 (see Figure 7) and a threaded inner end on which is threaded the nut 130. The inner end of the spindle 126 is passed through an aperture formed in a supporting plate 132 and is clamped to the plate by means of the nut 130 and a washer 134. The supporting plate 132 is secured to the flanges 106 of the steering knuckle by means of the bolts 136 which also serve to secure the backing plate 138 of the brake assembly to the plate 132.

The two part construction of the wheel spindle 126 and the supporting plate 132 permit the wheel spindle to be more easily machined since no provision need be made for balancing or holding the unsymmetrical supporting plate 132 which may be prepared separately. A key 140 is provided between the spindle 126 and the supporting plate 132 to prevent relative rotation between these parts. The spindle 126 and plate 132 may be substituted in the structure shown in Figure 2 for the spindle 64, 70 and vice versa.

The lower bolts 136 which hold the supporting plate 132 and the backing plate 138 to the steering knuckle 34A also serve to secure the steering knuckle arm 142 to the steering knuckle by means of which the steering knuckle and spindle are rotated about the axis of the king pin 98 to steer the vehicle. It will be noted that the stampings 102 in the steering knuckle 34A are not provided with ears such as the ears 54 in the steering knuckle 34 since there is no shock absorber to be attached to the steering knuckle. In both examples of the invention the wheel spindle and supporting plate may be permanently secured to the flanges of the steering knuckle stamping as by welding and the bolts 136 and 72 may be used only to attach the backing plates 74 and 138 to the steering knuckle and to reinforce the welded joint.

It should thus be apparent that the steering knuckle described is much lighter than a solid forged steering knuckle due to its hollow construction and attention is also called to the fact that the welded connection between the flanges 48 in Figures 1 and 2 and between the flanges 104 in Figures 3 to 6 is positioned along a generally horizontal line which is generally transverse to the loads applied to the steering knuckle so that there is no tendency for the steering knuckle to fail along the welded connection. The stampings 102 and the supporting plate 132 may be made of less expensive material than that required in the wheel spindle. Two examples of the steering knuckle have been illustrated to indicate that it may be used in any type of suspension in which a steering knuckle is supported upon a rotatable part as the sleeve 30 in Figures 1 and 2 and the king pin 98 in Figures 3 to 6. The extruded portions 52 and 110 may support bearing surfaces if it is desired to have the steering knuckle rotate with respect to the king pin.

While I have described my invention in some detail, I intend this description to be an example only and not as a limitation of my invention, to which I make the following claims:

1. A partially cylindrical hollow steering knuckle having an open side, a flange extending around said open side, and a wheel spindle including a flat plate secured to said flange, said steering knuckle having additional flanges providing an inner cylindrical portion spaced from the outer walls of said knuckle.

2. A partially cylindrical, stamped hollow steering knuckle having end walls that are pierced and extruded along lines generally parallel to the cylindrical portions of said stampings.

3. A partially cylindrical, stamped hollow steering knuckle having end walls that are pierced and extruded along lines generally parallel to the cylindrical portions of said stampings and an open side and a wheel spindle secured around said open side.

4. A steering knuckle comprising a pair of oppositely stamped cup shaped members, flanges formed along the rims of said cup shaped members, the bases of said cup shaped members being pierced and extruded inwardly of said steering knuckle, said flanges being secured together, and other flanges formed along one side of said steering knuckle and lying in a single plane arranged to support wheel supporting mechanism.

5. A steering knuckle comprising a pair of partially cylindrical stampings having an open side, flanges formed along the rims of said stampings, other flanges formed outwardly from the open side of said stampings, said first flanges being welded together with said other flanges positioned in a single plane, the bases of said stampings being pierced and extruded in axial alignment, a supporting plate secured to said other flanges, and a wheel spindle secured to said supporting plate.

6. A partially cylindrical hollow steering knuckle formed of two cup shaped stampings welded together at their rims and having an open side, and a wheel spindle removably secured along the open side of said steering knuckle.

7. A partially cylindrical hollow steering knuckle made of two cup shaped stampings welded together along their rims and having an open side, extruded portions formed in each end of said knuckle and in axial alignment, a rotatable shaft secured in said extruded portions, a supporting plate removably secured to the open side of said knuckle, and a wheel spindle removably secured to said supporting plate.

8. A hollow steering knuckle comprising a pair of oppositely formed stampings having base portions and flanged rim sections, the bases of said stampings being extruded inwardly of said stampings, said flanges being welded together, other flanges formed along a side of said stampings and lying in a single plane, means securing a rotatable shaft in said extruded portions of said stampings, a supporting plate secured to said other flanges along the open side of said stampings, a wheel spindle removably secured to said supporting plate, and a brake backing plate secured to said supporting plate.

9. A steering knuckle comprising a pair of oppositely formed stampings having semi-cylindrical body portions each with an open side, flanges turned outwardly of said semi-cylindrical body portions, said flanges having oppositely bent portions defining apertures along a line passing as a chord across the ends of and between said body portions, said flanges being welded together, extruded portions formed in each end of said stampings and in axial alignment, a shaft positioned in said extruded portions and extending beyond each end thereof, a pin extending through said apertures and arranged to lock said shaft in said stampings, and wheel supporting means secured to the open side of said stampings.

10. A steering knuckle comprising two partially cylindrical stampings each having an open side and being welded together along their rims and arranged to receive a rotatable shaft through their ends approximately at right angles with respect to the plane of the weld.

11. A steering knuckle comprising two semi-cylindrical stampings welded together along their rims and arranged to receive a shaft through their ends approximately at right angles with respect to the plane of the weld, the rims of said stampings having semi-circular notches defining aligned apertures arranged to receive a locking pin.

12. In a steering knuckle, a stamping having a base, side walls extending along three sides of said base, a flange turned outwardly from the edges of said side walls, and a second flange turned outwardly from the ends of said side wall and the edge of said base, said base being pierced and extruded.

13. In a steering knuckle, a stamping having a base, side walls extending along three sides of said base, a flange turned outwardly from the edges of said side walls, and a second flange turned outwardly from the free ends of said side walls and the edge of said base, said base being pierced and extruded, said first flange defining an aperture on the opposite side of said stamping from said second flange.

14. A steering knuckle for an automotive vehicle comprising a hollow outer shell provided with a flat surface on one side, said hollow outer shell having an inner stamped cylindrical portion located within said shell and extending partially therethrough in spaced relationship to said outer shell and having its principal axis extending generally parallel to said flat surface, and wheel spindle supporting means secured to said flat surface.

15. A steering knuckle for an automotive vehicle comprising a pair of open-ended hollow stampings each provided with a flat flange extending around the open end thereof and an aperture having an inwardly extruded flange in the closest end thereof extending toward said open end, means securing said flat flanges of said stampings together to form a box section, and means securing a wheel spindle to said stampings.

16. A steering knuckle for an automotive vehicle comprising a pair of open-ended hollow stampings each provided with a flat flange extending around the open end thereof, means securing said flat flanges of said stampings together to form a box section, and means securing a wheel spindle to said stampings, the axis of said steering knuckle lying approximately in the plane of said flanges.

17. A steering knuckle for automotive vehicles comprising a stamped outer hollow shell, said hollow outer shell having an inner stamped cylindrical portion located within and spaced from said outer shell by integral stamped flanged portions, means securing said inner and outer shells in spaced relationship, a wheel spindle secured to and carried by said outer shell, and a king pin received in said inner shell.

18. A steering knuckle for automotive vehicles comprising a hollow stamped body portion, a horizontal rib extending around said body portion, an attaching surface formed on the exterior of said body portion, means attaching a wheel spindle to said attaching surface, and means within said body portion supporting a king pin along an axis transverse to said wheel spindle.

ROSS H. PHELPS.